US011668160B1

(12) United States Patent
Passmore et al.

(10) Patent No.: US 11,668,160 B1
(45) Date of Patent: Jun. 6, 2023

(54) SUBSURFACE SAFETY VALVE WITH RECOUPLING MAGNET ASSEMBLY

(71) Applicant: Halliburton Energy Services, Inc., Houston, TX (US)

(72) Inventors: Kevin Robin Passmore, McKinney, TX (US); Bruce Edward Scott, McKinney, TX (US); James Dan Vick, Jr., Mineral Wells, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/747,820

(22) Filed: May 18, 2022

(51) Int. Cl.
*E21B 34/10* (2006.01)

(52) U.S. Cl.
CPC ........ *E21B 34/105* (2013.01); *E21B 2200/05* (2020.05)

(58) Field of Classification Search
CPC ..... E21B 34/10; E21B 34/105; E21B 2200/05
See application file for complete search history.

(56) References Cited

U.S. PATENT DOCUMENTS

| 11,035,199 | B2 | 6/2021 | Vick, Jr. et al. | |
|---|---|---|---|---|
| 2003/0155131 | A1 | 8/2003 | Mick, Jr. | |
| 2007/0068680 | A1* | 3/2007 | Vick | F16K 31/086 166/66.5 |
| 2007/0289734 | A1 | 12/2007 | McDonald et al. | |
| 2009/0218096 | A1* | 9/2009 | Vick, Jr | E21B 23/04 166/250.15 |
| 2012/0032099 | A1* | 2/2012 | Vick, Jr. | E21B 34/10 251/65 |
| 2012/0125597 | A1* | 5/2012 | Vick, Jr. | E21B 34/066 166/321 |
| 2015/0300124 | A1 | 10/2015 | Mailand et al. | |
| 2020/0032616 | A1 | 1/2020 | Vick, Jr. et al. | |
| 2020/0270965 | A1 | 8/2020 | Vick, Jr. et al. | |

FOREIGN PATENT DOCUMENTS

| WO | 2009020711 A2 | 2/2009 |
|---|---|---|
| WO | 2016172736 A1 | 10/2016 |

OTHER PUBLICATIONS

Halliburton Energy Services, Inc , International Search Report and Written Opinion, PCT/US2022/029889, dated Feb. 10, 2023, 12 pages.

* cited by examiner

*Primary Examiner* — Matthew R Buck
(74) *Attorney, Agent, or Firm* — Kilpatrick Townsend & Stockton LLP (57) ABSTRACT

A safety valve for a wellbore can include a piston, a flapper valve, a flow tube, a series of outer magnets, and a series of inner magnets. The piston can displace the flow tube, which can operate the flapper valve. The series outer magnets can be attached to an outer wall of the piston. The series of inner magnets can be attached to a flow tube of the safety valve. The series of outer magnets and the series of inner magnets can be arranged in a non-alternating polarity pattern. The non-alternating polarity pattern can be ordered in such a way that a first force to decouple the series of inner magnets from the series of outer magnets is larger than a second force to recouple the series of inner magnets to the series of outer magnets.

18 Claims, 9 Drawing Sheets

SUBSURFACE SAFETY VALVE WITH RECOUPLING MAGNET ASSEMBLY

TECHNICAL FIELD

The present disclosure relates generally to wellbore operations and, more particularly (although not necessarily exclusively), to subsurface safety valves with a coupling magnet assembly for use in the wellbore operations.

BACKGROUND

Hydrocarbons, such as oil and gas, can be extracted from subterranean formations that may be located onshore or offshore. Hydrocarbons can be extracted through a wellbore formed in a subterranean formation. Wellbore operations for extracting hydrocarbons can include drilling operations, completion operations, production operations, and the like. A safety valve can be installed in a wellbore during a completion operation. The safety valve can act as a failsafe to prevent an uncontrolled release of fluids. The safety valve can provide closure of a wellbore to prevent damage to surface production facilities or to prevent an emergency. Coupling and recoupling to the safety valve can be challenging.

DETAILED DESCRIPTION

Certain aspects and examples of the present disclosure relate to a magnet assembly for a safety valve in which the magnet assembly includes magnets with a non-alternating polarity pattern such that the magnets may be recoupled by a smaller force than the force needed to decouple the magnet assembly. Decoupling and recoupling the magnet assembly may involve decoupling and recoupling several outer magnets from several inner magnets. Decoupling the outer magnets from the inner magnets may include moving the outer magnets to a point where the outer magnets do not experience a maximal attractive force with the inner magnets. Recoupling the outer magnets to the inner magnets may include moving the outer magnets to a point where the outer magnets experience a maximal attractive force with corresponding inner magnets. The difference between the first force to decouple and the second force to recouple the outer magnets and the inner magnets may be achieved by arranging the outer magnets and inner magnets in an at least a partially non-alternating polarity pattern.

The safety valve may be opened and closed by a piston mechanically linked to the outer magnets by a mandrel. The piston may be extended by a hydraulic control line. Extending the piston may, by the linkage of the mandrel, translate the outer magnets against a spring within an inner chamber of the safety valve. A magnetic coupling between the outer magnets and the inner magnets may cause the outer magnets to pull the inner magnets as the extension of the piston translates the outer magnets. The inner magnets may be affixed to a flow tube. The motion of the inner magnets may cause the flow tube to move across a flapper valve to open the flapper valve. Retracting the piston may reverse this process, removing the flow tube from the flapper valve, allowing the flapper valve to close.

In some instances, the outer magnets can become uncoupled from the inner magnets and recoupling them can be difficult. Examples of instances can include safety valve closures, slam closures, or a stuck opening flow tube. This difficulty may arise from the forces used to recouple outer magnets and inner magnets. In safety valves possessing inner magnets and outer magnets in an alternating polarity pattern, the force to recouple the inner magnets to the outer magnets can be equal to the force required to decouple the inner magnets from the outer magnets. An alternating polarity pattern may constitute north-south, south-north, north-south for the outer magnets and a complementary pattern of south-north, north-south, south-north for the inner magnets. Each inner magnet may correspond to an outer magnet of equal size as well.

Safety valves using an alternating polarity pattern can be recoupled using a wireline or slickline. But, a design that allows recoupling series of magnets with alternating polarity patterns using a wireline may compromise the size of the safety valve to account for the relatively low recoupling force that a wireline can provide. Larger safety valves with magnet assemblies that may require too great a force to be recoupled by a slickline may require a costly and potentially destructive well intervention.

A safety valve with a magnetic assembly with a lower recoupling force relative to its decoupling force can allow for wireline intervention across all valve sizes. Also, a safety valve with a lower recoupling force can be recoupled by a wider range of methods, such as electrical motors. Traditional safety valves may require hydraulic surface pressure or, if actuated by electric motor, the generated force may be too small to recouple the magnets for some scenarios.

A magnetic assembly with a lower recoupling force relative to its decoupling force may have the outer magnets arranged in a non-alternating pattern, such as north-south, south-north, north-south, north-south. The inner magnets may be arranged in a complementary, non-alternating polarity, such as south-north, north-south, south-north, south-north. Other polarity patterns are also possible.

The outer magnets and inner magnets may be of varying, complementary sizes. For example, a first outer magnet and a first inner magnet may be of a first size, a second outer magnet and a second inner magnet may be of a second size, a third outer magnet and a third inner magnet may be of a third size, and so on, where the first size, the second size, and the third size are different sizes as compared to each other. In some examples, a complementary pair of outer magnets and inner magnets may be different sizes with respect to each other. In other examples, at least one complementary pair of outer magnets and inner magnets may be of different sizes.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
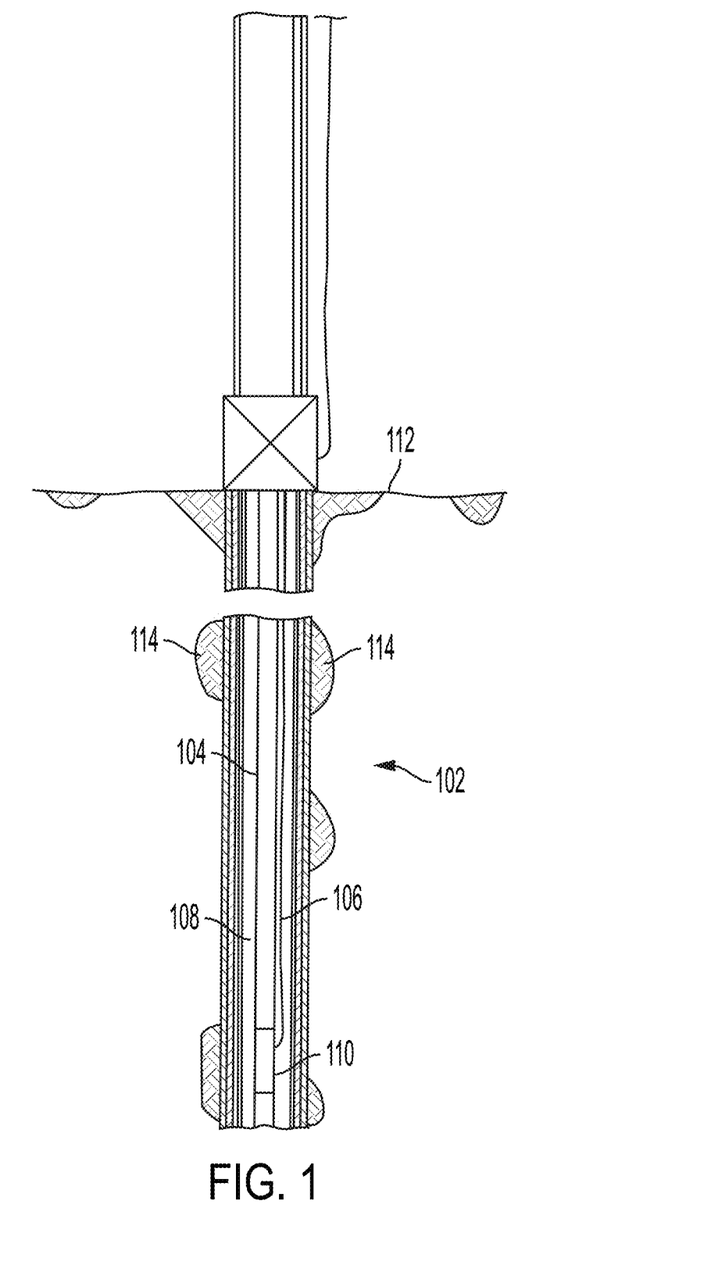
FIG. 1 is a cross sectional view of a subsurface safety valve disposed within a wellbore according to one example of the present disclosure.

FIG. 1 is a cross sectional view of a safety valve that is a subsurface safety valve 110 disposed within a wellbore 102 according to one example of the present disclosure. The safety valve 110 is interconnected in a tubing string 104 positioned in the wellbore 102. A control line 106 extends from a surface 112, into the wellbore 102 and is connected to the safety valve 110. A space between a geological formation 114 and the tubing string 104 defines an annulus 108 of the wellbore 102.

The wellbore 102 is depicted in FIG. 1 with a subsea well, but the safety valve 110 may be deployed in other environments. The control line 106 may be a hydraulic control line for actuating the safety valve 110. In some examples, the control line 106 may actuate the safety valve 110 with electrical, optical, or other suitable signals. In other examples, the safety valve 110 may not require any control line and may be actuated by other means, such as acoustic signals or an automated process executed within the safety valve 110.

The safety valve 110 may be closed by a first force and opened by a second force. The first force may egress a piston of the safety valve 110 from a chamber defined by a portion of the safety valve 110. The first force may be provided by a hydraulic force from the control line 106, stored mechanical energy from a device such as a spring, a compressed gas, an electric motor, or fluid pressure from the annulus 108 of the wellbore 102. The second force may also be provided by a hydraulic force from a second control line distinct from the control line 106, stored mechanical energy from a device such as a spring, a compressed gas, an electric motor, or the fluid pressure from the annulus 108 of the wellbore 102. Other sources for the first or second force are also possible.

Figure 2:
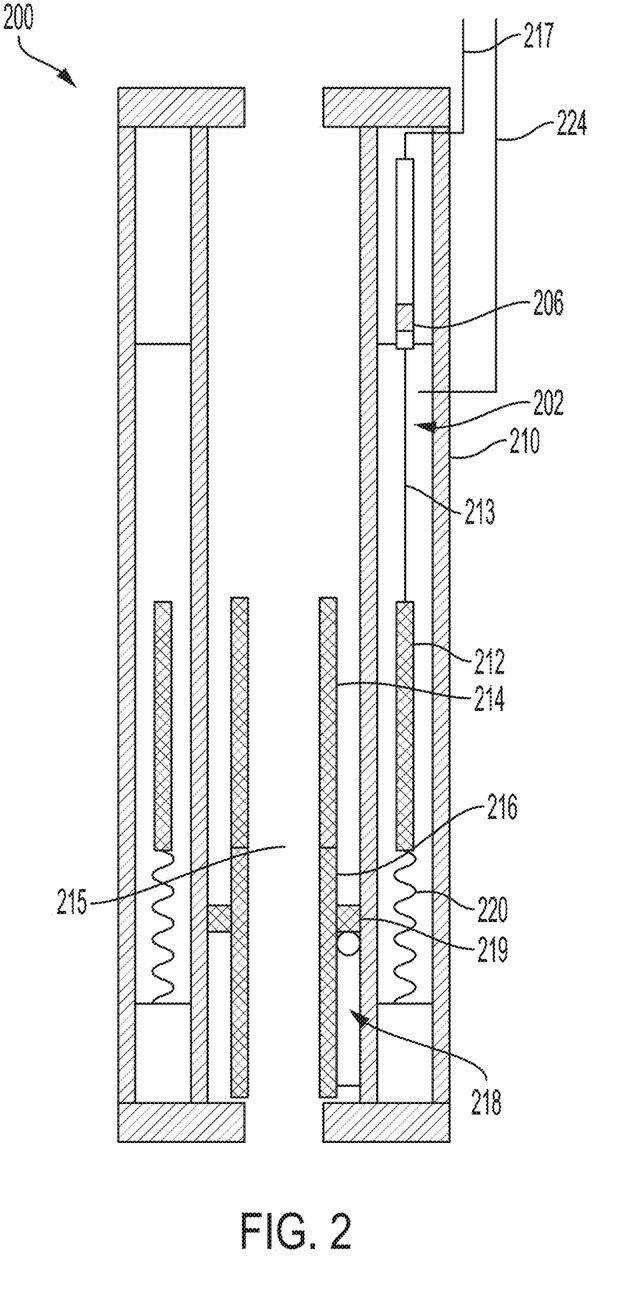
FIG. 2 is a cross-sectional view of an open subsurface safety valve containing a magnet assembly according to one example of the present disclosure.

FIG. 2 is a cross-sectional view of an open subsurface safety valve 200 containing a magnet assembly according to one example of the present disclosure. The magnet assembly includes outer magnets 212 attached to a piston 206 by a mandrel 213 and inner magnets 214 attached to a flow tube 216. The position of piston 206 may be controlled by a hydraulic control line 217 and a balance line 224. The outer magnets may be positioned within an inner chamber 202 of the safety valve 200. The flow tube 216 and inner magnets 214 may be positioned within a bore 215 of the safety valve 200. The flow tube 216 may extend past a flapper valve 218. The flapper valve 218 may be attached to the safety valve 200 at a seat 219. The outer magnets 212 and the inner magnets 214 may be in alignment when the position of the inner magnets 214 parallels the position of the outer magnets 212. Alignment may be understood as a condition when every magnet of the outer magnets 212 experiences a maximal magnetic force with every corresponding magnet of the inner magnets 214. For example, a first outer magnet may be aligned with a first inner magnet, a second outer magnet may be aligned with a second inner magnet, and a third outer magnet may be aligned with a third inner magnet. An outer magnet and an inner magnet may be corresponding when they are of equal size and opposite polarity.

Alignment of the outer magnets 212 and the inner magnets 214 may result in a magnetic force sufficient to magnetically couple the outer magnets 212 and the inner magnets 214. The magnetic coupling of the outer magnets 212 and the inner magnets 214 may cause the position of the inner magnets 214 to parallel the position of the outer magnets 212. The magnetic coupling may be maintained through a housing 210.

The hydraulic control line 217 may extend the piston 206. The mandrel 213, linking the piston 206 to the outer magnets 212, may displace the outer magnets 212 against a spring 220 within the inner chamber 202. The position of the outer magnets 212 may pull the inner magnets 214 and the flow tube 216 across the flapper valve 218, thus holding the flapper valve 218 open. The hydraulic control line 217 may, by the mechanical linkage of the mandrel 213 and the magnetic coupling of the outer magnets 212 to the inner magnets 214, overcome a spring force within or proximal to a hinge of the flapper valve 218. The spring force within or proximal to the hinge of the flapper valve 218 may be biased to hold the flapper valve 218 closed.

Figure 3:
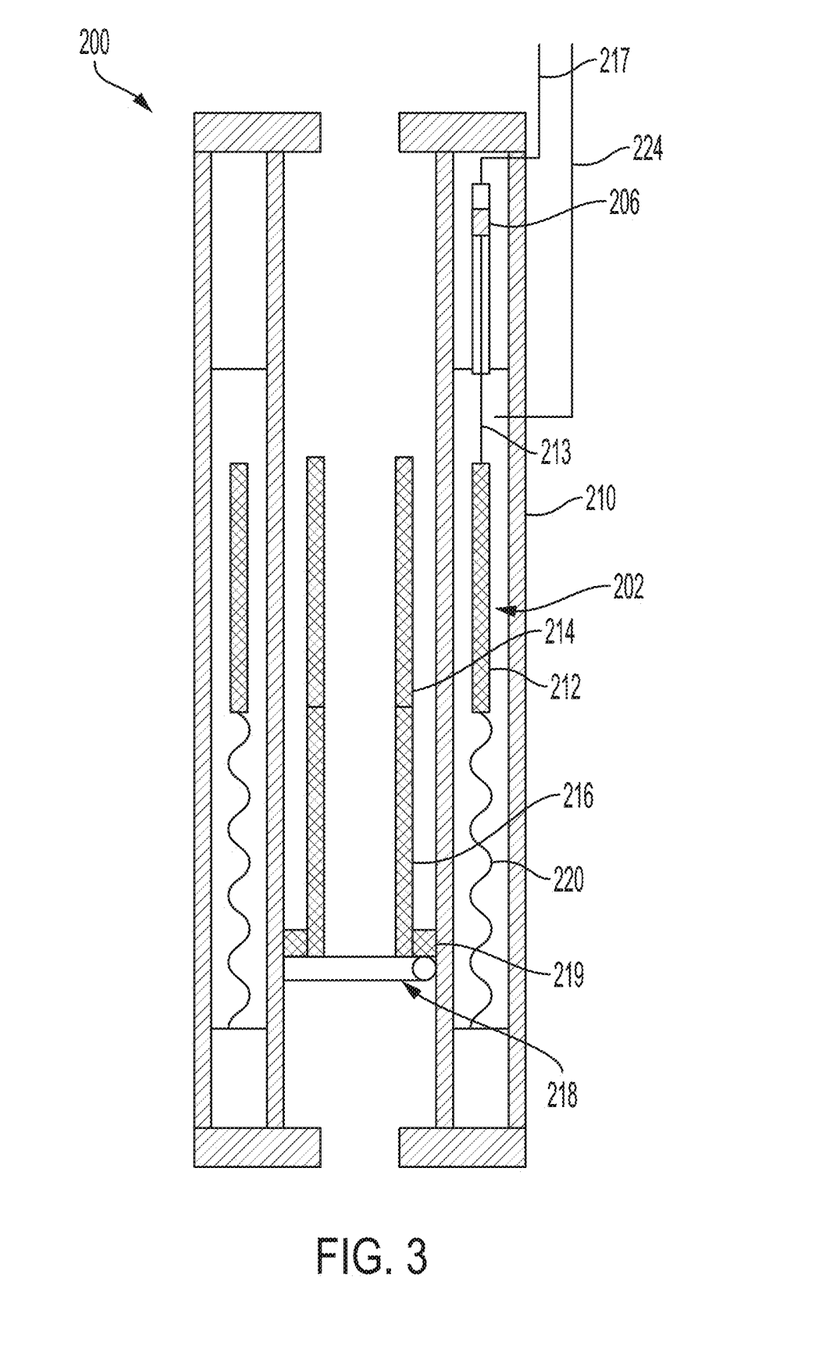
FIG. 3 is a cross-sectional view of a closed subsurface safety valve containing a magnet assembly according to one example of the present disclosure.

FIG. 3 is a cross-sectional view of a closed subsurface safety valve 200 containing a magnet assembly according to one example of the present disclosure. The flow tube 216 is not positioned across the flapper valve 218. The flapper valve 218 is in the closed position. The piston 206 is in a retracted position relative to FIG. 2.

The flapper valve 218 may return to the closed position under the spring force within the hinge of the flapper valve 218, wherein the spring force is biased to hold the flapper valve 218 in the closed position. The flow tube 216 may have retreated to a retracted position in the safety valve 200. With the flow tube 216 in the retracted position, the spring force within the hinge of the flapper valve 218 may no longer be impeded by the flow tube 216 being across the flapper valve 218.

The flow tube 216 may have moved to the retracted positon by the piston 206 moving to the corresponding retracted position. The retreated position of the flow tube 216 and the corresponding retracted position of the piston 206 may be linked by the magnetic coupling between the outer magnets 212 and the inner magnets 214. The piston 206 may have moved to the retracted position from both the force of the spring 220 acting on the outer magnets 212.

Figure 4:
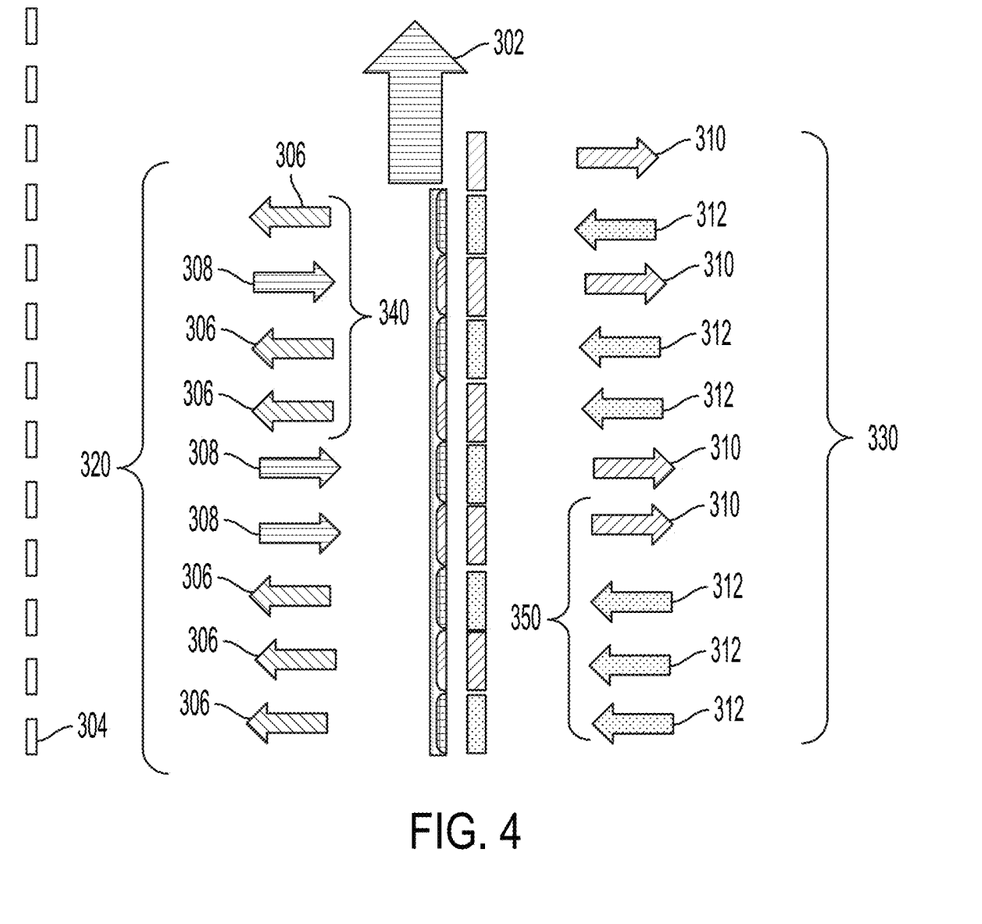
FIG. 4 is a schematic of polarity sequences of a magnet assembly of a safety valve according to one example of the present disclosure.

FIG. 4 is a schematic of polarity sequences of a magnet assembly of a safety valve according to one example of the present disclosure. A motion of inner magnets 302 relative to outer magnets parallels an axis of rotation 304 of a safety valve. A series of inner magnets 320 includes inner magnets of north-south orientation 306 and inner magnets of south-north orientation 308. A series of outer magnets 330 includes outer magnets of south-north orientation 310 and outer magnets of north-south orientation 312.

The motion of the inner magnets 302 may result in the magnetic coupling of the series of inner magnets 320 and the series of outer magnets 330. A first force to decouple the series of inner magnets 320 from the series of outer magnets 330 may be greater than a second force to recouple the series of inner magnets 320 to the series of outer magnets 330. The discrepancy between the first force and the second force may result from a non-alternating polarity pattern of the series of inner magnets 320 and a complementary non-alternating polarity pattern of the series of outer magnets 330.

The non-alternating polarity pattern and the complementary non-alternating polarity pattern may contribute to the second force by supplying attractive magnetic forces towards the motion of the inner magnets 302 as well as supplying repellant magnetic forces towards the motion of the inner magnets 302. As the motion of the inner magnets 302 progresses, inner magnets of north-south orientation 306 pull towards outer magnets of south-north orientation 310 in some positions, whereas the inner magnets of north-south orientation 306 may push off outer magnets of north-south orientation 312 in other positions.

The discrepancy between the first force and the second force may also result from a polarity pattern that gradates magnetic couplings between magnets of the series of inner magnets 320 with the series of outer magnets 330 such that the motion of the inner magnets 302 may not have to overcome a magnetic coupling force that is the sum of every inner magnet and every outer magnet currently aligned at any given position. For example, a magnetic assembly with an alternating polarity pattern for both the inner magnets and the outer magnets may be in a position where four of the outer magnets may align with four of the inner magnets. To progress the motion of inner magnets to a next stable position may require breaking four magnetic couplings and overcoming four magnetic repulsions. But, if the top four magnets 340 of the series of inner magnets 320 moved towards alignment with the bottom four magnets 350 of the series of outer magnets 330, advancing the motion of the inner magnets 302 may move towards a greater or equal amount of magnetic couplings and move away from an equal or lesser amount of magnetic repulsions in comparison to a magnetic assembly with the alternating polarity pattern. An example of a progression between the top four magnets 340 of the series of inner magnets 320 and the bottom four magnets 350 of the series of outer magnets 330 is illustrated in FIG. 5.

Figure 5:
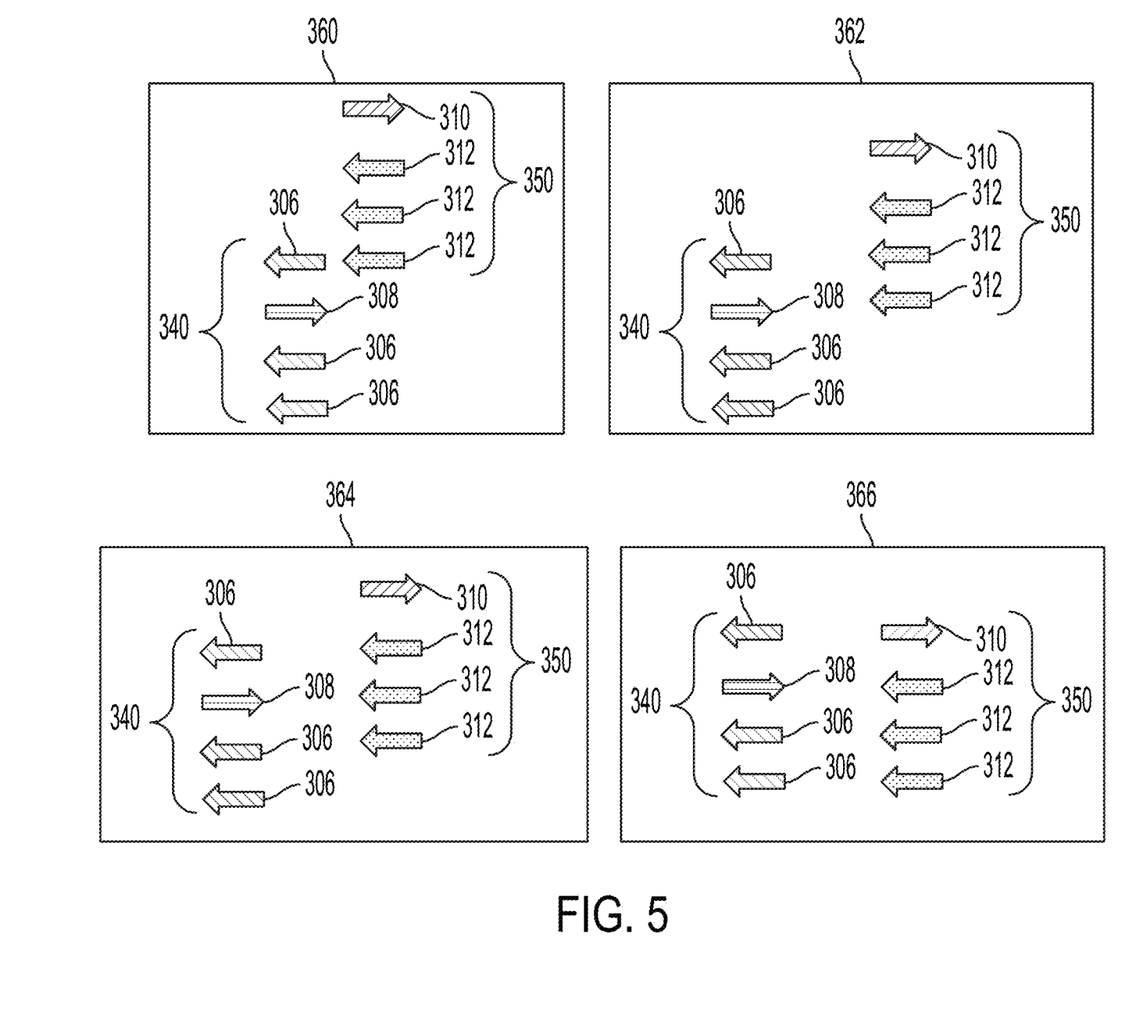
FIG. 5 is a schematic of magnets ordered in a non-alternating polarity sequence coupling to another series of magnets ordered in a non-alternating polarity sequence, according to one example of the present disclosure.

FIG. 5 is a schematic of magnets ordered in a non-alternating polarity sequence coupling to another series of magnets ordered in a non-alternating polarity sequence, according to one example of the present disclosure. In the present example, a coupling of the top four magnets 340 of the series of inner magnets 320 and the bottom four magnets 350 of the series of outer magnets 330 progresses from a first position 360, to a second position 362, to a third position 364, to a fourth position 366.

In the first position 360, an inner magnet of north-south orientation 306 may experience a repulsive magnetic force from an outer magnet of north-south orientation 312. The repulsive magnetic force resulting from the first position 360 may oppose the second force necessary to recouple the series of inner magnets 320 to the series of outer magnets 330.

Progressing from the first position 360 to the second position 362 may involve overcoming another repulsive magnetic force from an inner magnet of north-south orientation 306 moving to face another outer magnet of north-south orientation 312. Simultaneously progressing to magnetic coupling between an inner-magnet of south-north orientation 308 and an outer magnet of north-south orientation 312 may contribute to the second force necessary to recouple the series of inner magnets 320 to the series of outer magnets 330.

Progressing from a second position 362 to a third position 364 may involve overcoming repulsive forces from two inner magnets of north-south orientation 306 facing two outer magnets of north-south orientation 312. Progressing from the second position 362 to the third position 364 may simultaneously involve breaking a magnetic coupling between an inner-magnet of south-north orientation 308 and an outer magnet of north-south orientation 312 as well as coupling the inner magnet of south-north orientation 308 to an outer magnet of north-south orientation 312. The repulsive force resulting from the two inner magnets of north-south orientation 306 facing the two outer magnets of north-south orientation 312 may reduce the coupling force between the inner magnet of south-north orientation 308 and the outer magnet of north-south orientation 312. The combination of repellant magnetic forces, breaking magnetic couplings, and forming new magnetic couplings may contribute more to a second recoupling force than an example in which two magnetic couplings must be broken to form three new magnetic couplings. An example in which two magnetic couplings must be broken to form three new magnetic couplings may involve inner magnets arranged in a pattern of alternating polarity and outer magnets arranged in a pattern of alternating polarity.

Progressing from a third position 364 to a fourth position 366 may involve overcoming repulsive forces from two inner magnets of north-south orientation 306 facing two outer magnets of north-south orientation 312. Progressing from the third position 364 to the fourth position 366 may simultaneously involve breaking a magnetic coupling between an inner-magnet of south-north orientation 308 and an outer magnet of north-south orientation 312 as well as coupling the inner-magnet of south-north orientation 308 to an outer magnet of north-south orientation and coupling an inner magnet of north-south orientation 306 to an outer magnet of south-north orientation 310. The repulsive force resulting from the two inner magnets of north-south orientation 306 facing the two outer magnets of north-south orientation 312 may reduce the coupling force between the inner magnet of south-north orientation 308 and the outer magnet of north-south orientation 312. The combination of repellant magnetic forces, breaking magnetic couplings, and forming new magnetic couplings may contribute more to a second recoupling force than an example in which three magnetic couplings must be broken to form four new magnetic couplings. An example in which three magnetic couplings must be broken to form four new magnetic couplings may involve inner magnets arranged in a pattern of alternating polarity and outer magnets arranged in a pattern of alternating polarity.

Figure 6:
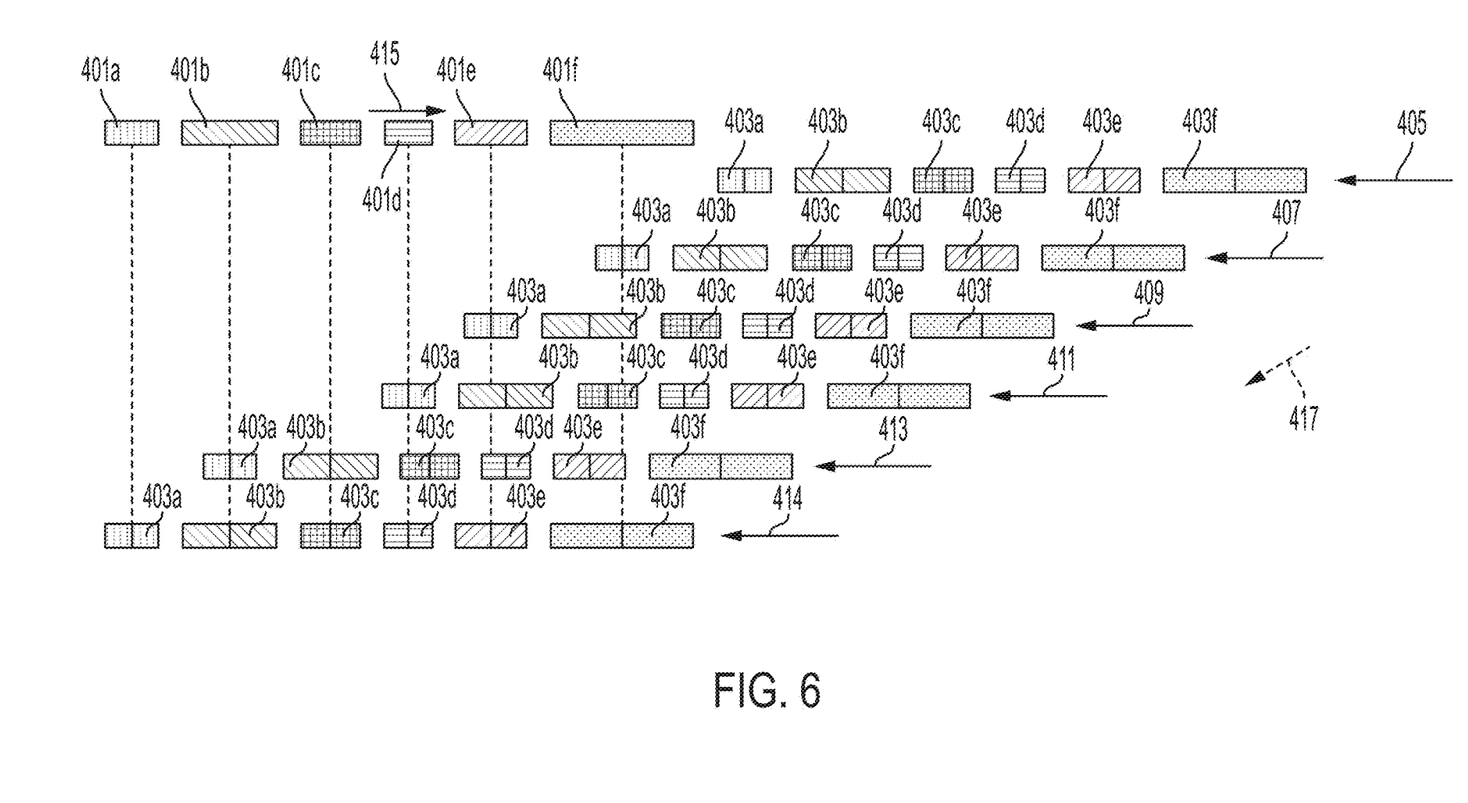
FIG. 6 is a schematic of a series of outer magnets of varying sizes coupling to a series of inner magnets of varying sizes according to one example of the present disclosure.

FIG. 6 is a schematic of a series of outer magnets of varying sizes coupling to a series of inner magnets of varying sizes according to one example of the present disclosure. A series of outer magnets is illustrated as 401*a-f*. A series of inner magnets is illustrated as 403*a-f*. A coupling progression 417 resulting from a motion of the outer magnets 415 moves through a first position 405, a second position 407, a third position 409, a fourth position 411, a fifth position 413, and a fully coupled position 414.

The first position 405 may result in no magnets from the series of outer magnets 401*a-f* aligning with the any magnet from the series of inner magnets 403*a-f*. The second position 407, third position 409, fourth position 411, and fifth position may result in only a first inner magnet 403*a* aligning with a single magnet from the series of outer magnets 401a-f. In the second position 407 the first inner magnet 403a may align with a sixth outer magnet 401f. In the third position 409 the first inner magnet 403a may align with a fifth outer magnet 401e. In the fourth position 411 the first inner magnet 403a may align with fourth outer magnet 401d. In the fifth position 413 the first inner magnet 403a may align with the second outer magnet 401b. In the fully coupled position 414 every magnet from the series of outer magnets 401a-f may align with every corresponding magnet from the series of inner magnets 403a-f. In the fully coupled position 414 the first inner magnet 403a may align with the first outer magnet 401a, the second inner magnet 403b may align with the second outer magnet 401b, the third inner magnet 403c may align with the third outer magnet 401c, the fourth inner magnet 403d may align with the fourth outer magnet 401d, the fifth inner magnet 403e may align with the fifth outer magnet 401e, and the sixth inner magnet 403f may align with the sixth outer magnet 401f.

Random, varying sizes of magnets within the series of outer magnets 401a-f and magnets of corresponding size within the series of inner magnets 403a-f may reduce a force required to recouple the series of outer magnets 401a-f to the series of inner magnets 403a-f. The random, varying sizes of magnets may reduce the amount of magnetic couplings that may be overcome during the coupling progression 417. In the present example, progressing from the second position 407 to the third position 409, the third position 409 to the fourth position 411, the fourth position 411 to the fifth position 413, or the fifth position 413 to the fully coupled position 414 may in each instance only require overcoming the complete magnetic coupling of a single pair of magnets.

Arranging magnets of random, varying sizes into a particular orientation may further reduce the force required to recouple the series of outer magnets 401a-f to the series of inner magnets 403a-f by creating a misalignment with a center of at least one magnet from the series inner magnets 403a-f and a center of at least one magnet from the series of outer magnets 401a-f. The misalignment may contribute to a pole jumping effect that may result from at least one attractive magnetic force, at least one repulsive magnetic force, or a combination of at least one attractive magnetic force and at least one repulsive magnetic force.

Figure 7:
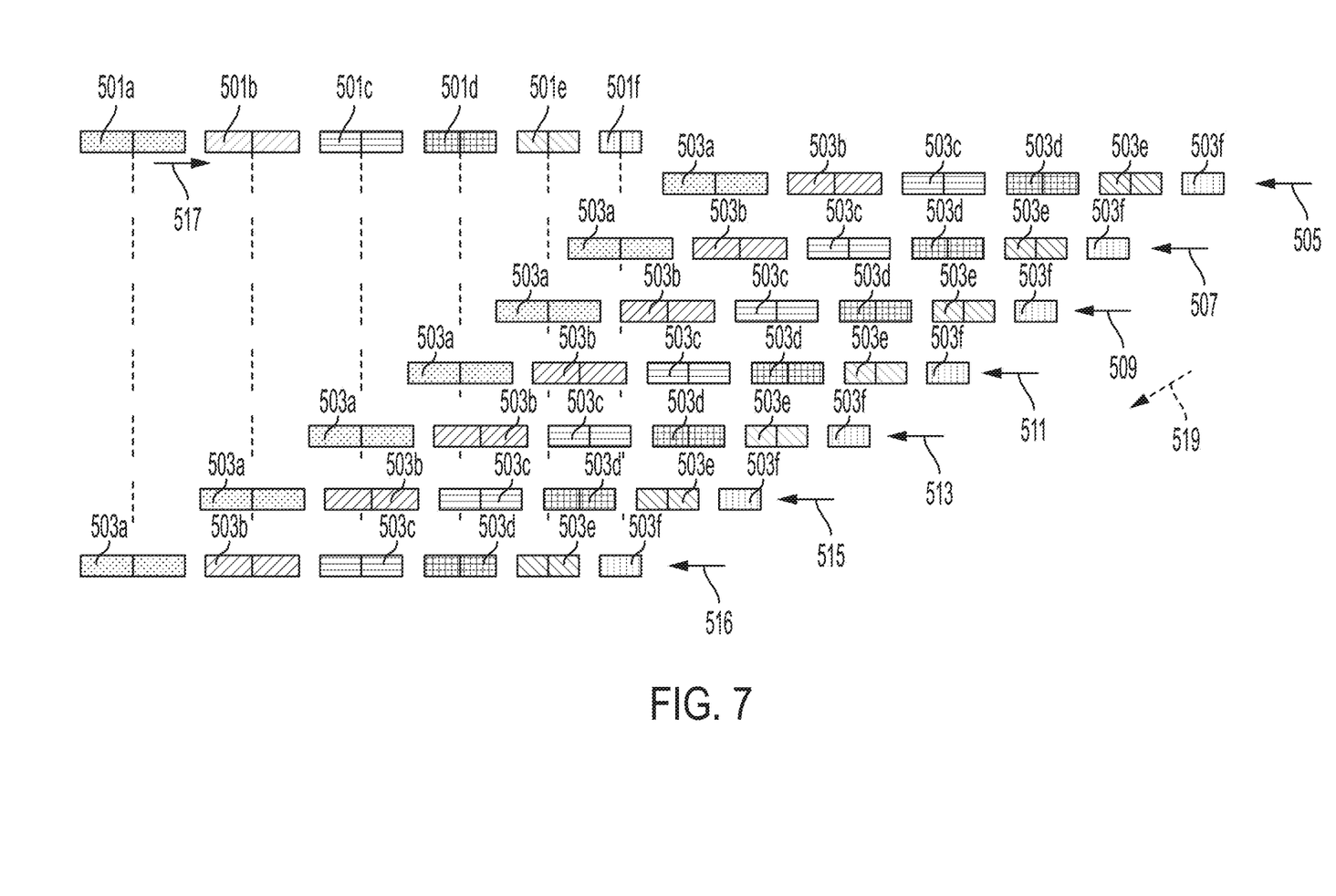
FIG. 7 is a schematic of a series of outer magnets of decreasing sizes coupling to a series of inner magnets of corresponding, decreasing sizes according to one example of the present disclosure.

FIG. 7 is a schematic of a series of outer magnets of decreasing sizes coupling to a series of inner magnets of corresponding, decreasing sizes according to one example of the present disclosure. A series of outer magnets is illustrated as 501a-f. A series of inner magnets is illustrated as 503a-f. A coupling progression 519 resulting from a motion of the outer magnets 517 moves through a first position 505, a second position 507, a third position 509, a fourth position 511, a fifth position 513, a sixth position 515, and a fully coupled position 516.

The first position 505 may result in no magnets from the series of outer magnets 501a-f aligning with the any magnet from the series of inner magnets 503a-f. The second position 507, third position 509, fourth position 511, fifth position 513, and sixth position 515 may result in only a first inner magnet 503a aligning with a single magnet from the series of outer magnets 501a-f. In the second position 507 the first inner magnet 503a may align with a sixth outer magnet 501f. In the third position 509 the first inner magnet 503a may align with a fifth outer magnet 501e. In the fourth position 511 the first inner magnet 503a may align with fourth outer magnet 501d. In the fifth position 513 the first inner magnet 503a may align with the third outer magnet 501c. In the sixth position 515 the first inner magnet 503a may align with the second outer magnet 501b. In the fully coupled position 516 every magnet from the series of outer magnets 501a-f may align with every corresponding magnet from the series of inner magnets 503a-f. In the fully coupled position 516 the first inner magnet 503a may align with the first outer magnet 501a, the second inner magnet 503b may align with the second outer magnet 501b, the third inner magnet 503c may align with the third outer magnet 501c, the fourth inner magnet 503d may align with the fourth outer magnet 501d, the fifth inner magnet 503e may align with the fifth outer magnet 501e, and the sixth inner magnet 503f may align with the sixth outer magnet 501f.

Ordering the series of outer magnets 501a-f by decreasing size and ordering the series of inner magnets 503a-f in parody to the series of outer magnets 501a-f may reduce a force required to recouple the series of outer magnets 501a-f to the series of inner magnets 503a-f. The decreasing arrangement of magnets may reduce the amount of magnetic couplings that may be overcome during the coupling progression 519. In the present example, progressing from the second position 507 to the third position 509, the third position 509 to the fourth position 511, the fourth position 511 to the fifth position 513, the fifth position 513 to the sixth position 515, or the sixth position 515 to the fully coupled position 516 may in each instance only require overcoming the complete magnetic coupling of a single pair of magnets.

Ordering the series of outer magnets 501a-f and the series of inner magnets 503a-f by decreasing size may further reduce the force required to recouple the series of outer magnets 501a-f to the series of inner magnets 503a-f by creating a misalignment with a center of at least one magnet from the series inner magnets 503a-f and a center of at least one magnet from the series of outer magnets 501a-f. The misalignment may contribute to a pole jumping effect that may result from at least one attractive magnetic force, at least one repulsive magnetic force, or a combination of at least one attractive magnetic force and at least one repulsive magnetic force.

Figure 8:
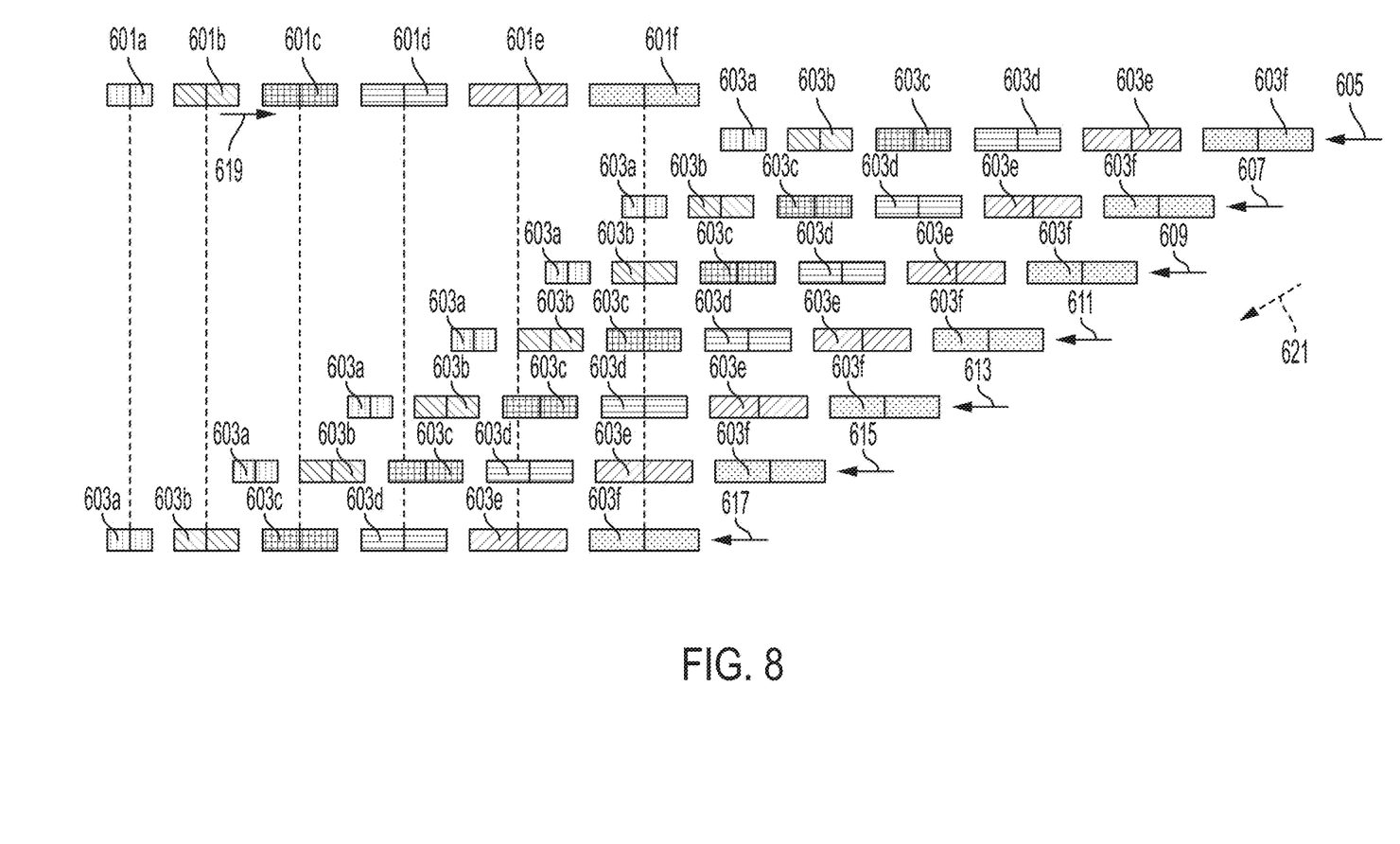
FIG. 8 is a schematic of a series of outer magnets of increasing sizes coupling to a series of inner magnets of increasing sizes according to one example of the present disclosure.

FIG. 8 is a schematic of a series of outer magnets of increasing sizes coupling to a series of inner magnets of corresponding, increasing sizes according to one example of the present disclosure. A series of outer magnets is illustrated as 601a-f. A series of inner magnets is illustrated as 603a-f. A coupling progression 621 resulting from a motion of the outer magnets 619 moves through a first position 605, a second position 607, a third position 609, a fourth position 611, a fifth position 613, a sixth position 615, and a fully coupled position 617.

The first position 605 may result in no magnets from the series of outer magnets 601a-f aligning with the any magnet from the series of inner magnets 603a-f. The second position 607, third position 609, fourth position 611, fifth position 613, and sixth position 615 may result in only a single magnet from the series of inner magnets 603a-f aligning with the sixth outer magnet 601f. In the second position 607 the first inner magnet 603a may align with a sixth outer magnet 601f. In the third position 609 the second inner magnet 603b may align with a sixth outer magnet 601f. In the fourth position 611 the third inner magnet 603c may align with the sixth outer magnet 601f. In the fifth position 613 the fourth inner magnet 603d may align with the sixth outer magnet 601f. In the sixth position 615 the fifth inner magnet 603e may align with the sixth outer magnet 601f. In the fully coupled position 617 every magnet from the series of outer magnets 601a-f may align with every corresponding magnet from the series of inner magnets 603a-f. In the fully coupled position 617 the first inner magnet 603a may align with the first outer magnet 601a, the second inner magnet 603b may align with the second inner magnet 601b, the third inner magnet 603c may align with the third outer magnet 601c, the fourth inner magnet 603d may align with the fourth outer magnet 601d, the fifth inner magnet 603e may align with the fifth outer magnet 601e, and the sixth inner magnet 603f may align with the sixth outer magnet 601f.

Ordering the series of outer magnets 601a-f by increasing size and ordering the series of inner magnets 603a-f in parody to the series of outer magnets 601a-f may reduce a force required to recouple the series of outer magnets 601a-f to the series of inner magnets 603a-f. The increasing arrangement of magnets may reduce the amount of magnetic couplings that may be overcome during the coupling progression 621. In the present example, progressing from the second position 607 to the third position 609, the third position 609 to the fourth position 611, the fourth position 611 to the fifth position 613, the fifth position 613 to the sixth position 615, or the sixth position 615 to the fully coupled position 616 may in each instance only require overcoming the complete magnetic coupling of a single pair of magnets.

Ordering the series of outer magnets 601a-f and the series of inner magnets 603a-f by increasing size may further reduce the force required to recouple the series of outer magnets 601a-f to the series of inner magnets 603a-f by creating a misalignment with a center of at least one magnet from the series inner magnets 603a-f and a center of at least one magnet from the series of outer magnets 601a-f. The misalignment may contribute to a pole jumping effect that may result from at least one attractive magnetic force, at least one repulsive magnetic force, or a combination of at least one attractive magnetic force and at least one repulsive magnetic force.

Figure 9:
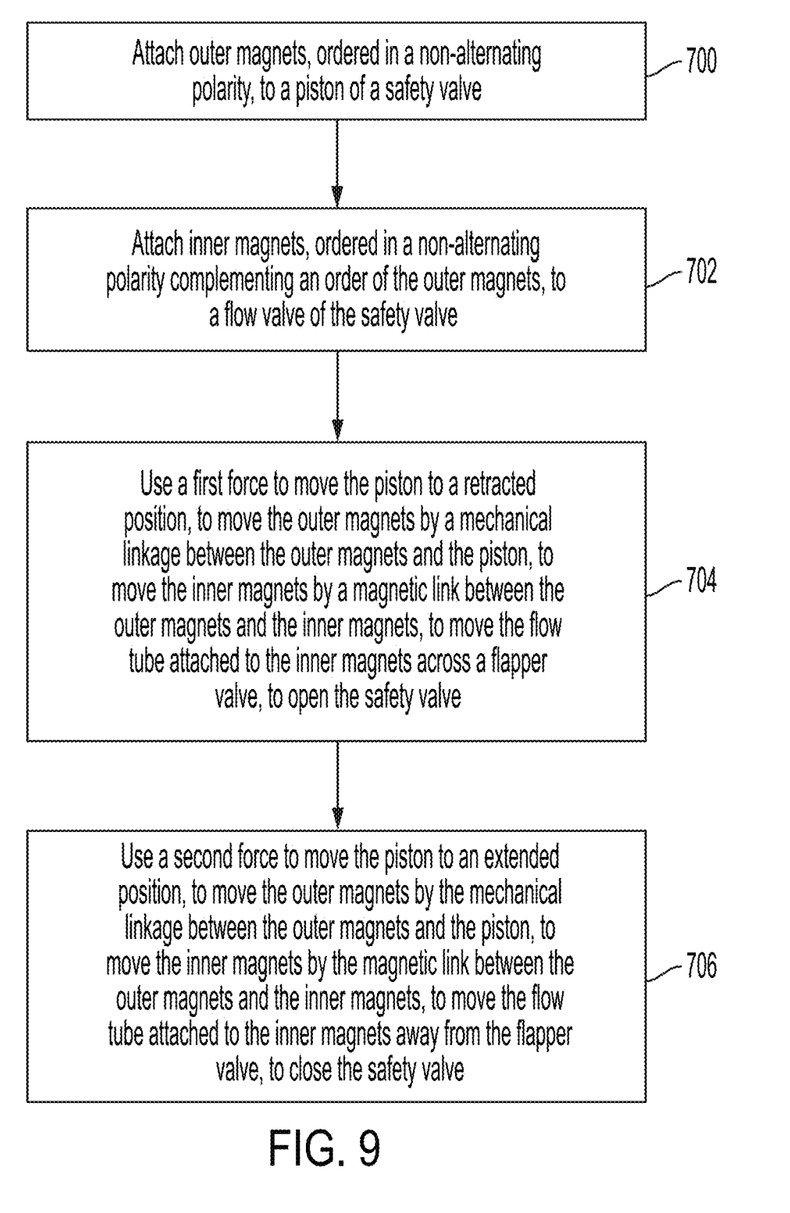
FIG. 9 is a flowchart of a process for closing and opening a safety valve according to one example of the present disclosure.

FIG. 9 is a flowchart of a process for closing and opening a safety valve according to one example of the present disclosure. In block 700, outer magnets ordered in a non-alternating polarity pattern may be connected to a piston of a safety valve. The non-alternating polarity pattern of the outer magnets may be arranged such that movement of the outer magnets relative to a series of magnets arranged in a mirror-opposite, non-alternating polarity pattern may result in attractive and repulsive magnetic forces that can reduce a force needed to couple the outer magnets to the series of magnets arranged in the mirror-opposite pattern. An example non-alternating pattern for the series of outer magnets may be north-south, north-south, south-north. An example mirror-opposite pattern corresponding to the aforementioned example may be south-north, south-north, north-south. Other patterns are also possible. The series of outer magnets may be of varying sizes. For example, the outer magnets may include a first magnet of a first size, a second magnet of a second size, and a third magnet of a third size. The series of outer magnets may be ordered in by increasing, decreasing, or a random pattern of size. Other patterns are also possible.

In block 702, inner magnets ordered in a non-alternating polarity pattern may be connected to a flow tube within a safety valve. The inner magnets may partially or fully align with the outer magnets. The non-alternating polarity pattern of the series of inner magnets may be arranged as the mirror-opposite, non-alternating polarity pattern of the series of outer magnets. The series of inner magnets may also be of varying sizes. The varying sizes of the series of inner magnets may be in parody with the varying sizes of the series of outer magnets. For example, a first inner magnet may be the same size as the first outer magnet, a second inner magnet may be the same size as the second outer magnet, and a third inner magnet may be the same size as the third outer magnet. In some examples, the combined length of the inner magnets may be longer or shorter than the combined length of the outer magnets.

In block 704, a first force may be used to move the piston to an extended position, which may move the outer magnets by a mechanical linkage between the outer magnets and the piston, which may move the inner magnets by a magnetic coupling between the outer magnets and the inner magnets, which may displace the flow tube attached to the inner magnets across the flapper valve, to open the safety valve. The first force may result from a pressurized gas stored within or proximal to the safety valve, a hydraulic pressure, an electric motor, a spring, or a wireline. Other sources of the first force are also possible.

In block 706, a second force may be used to move the piston to an extended position, which may move the outer magnets by a mechanical linkage between the outer magnets and the piston, which may move the inner magnets by a magnetic coupling between the outer magnets and the inner magnets, which may displace the flow tube attached to the inner magnets across the flapper valve, to open the safety valve. The second force may result from a pressurized gas stored within or proximal to the safety valve, a hydraulic pressure, an electric motor, a spring, or a wireline. Other sources of the first force are also possible.

In some aspects, apparatus, systems, and methods for the safety valve are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a safety valve usable in a wellbore, the safety valve comprising: a piston configured for displacing a flow tube; a flapper valve; the flow tube for opening the flapper valve; a plurality of outer magnets attached to the piston, at least some of the plurality of outer magnets having a non-alternating polarity with respect to one or more adjacent outer magnets of the plurality of outer magnets; and a plurality of inner magnets coupled to the flow tube, at least some of the plurality of inner magnets having the non-alternating polarity with respect to one or more adjacent inner magnets of the plurality of inner magnets such that a first force to decouple the plurality of inner magnets from the plurality of outer magnets is higher than a second force to recouple the plurality of inner magnets to the plurality of outer magnets.

Example 2 is the safety valve of example(s) 1, wherein: the plurality of outer magnets comprises at least a first outer magnet, a second outer magnet, and a third outer magnet; the plurality of inner magnets comprises at least a first inner magnet, a second inner magnet, and a third inner magnet; the first outer magnet and the first inner magnet are of a first size; the second outer magnet and the second inner magnet are of a second size; and the third outer magnet and the third inner magnet are of a third size.

Example 3 is the safety valve of example(s) 2, wherein a complete coupling of the plurality of inner magnets to the plurality of outer magnets comprises the first outer magnet aligning with the first inner magnet, the second outer magnet aligning with the second inner magnet, and the third outer magnet aligning with the third inner magnet.

Example 4 is the safety valve of example(s) 1, wherein a polarity sequence of the plurality of outer magnets and the polarity sequence of the plurality of inner magnets are for the piston to extend into a portion of the safety valve such that as the piston extends, a jumping effect caused by a misalignment of at least one outer magnet and at least one inner magnet contributes to the second force to recouple the plurality of inner magnets to the plurality of outer magnets.

Example 5 is the safety valve of example(s) 1, wherein the safety valve is a wireline retrievable safety valve.

Example 6 is the safety valve of example(s) 1, wherein the safety valve is a subsurface safety valve.

Example 7 is the subsurface safety valve of example(s) 6, wherein a complete coupling of the plurality of inner magnets to the plurality of outer magnets holds the piston in an extended position within the safety valve, thus holding the flapper valve over the flapper valve to open the flapper valve, thus utilizing the complete coupling of the plurality of inner magnets to the plurality of outer magnets to resist a closing of the flapper valve.

Example 8 is a magnet assembly for a safety valve usable in a wellbore, the magnet assembly comprising: a plurality of outer magnets attached to a piston of the safety valve, at least some of the plurality of outer magnets having a non-alternating polarity with respect to one or more adjacent outer magnets of the plurality of outer magnets, a plurality of inner magnets for coupling to a flow tube of the safety valve, at least some of the plurality of inner magnets having a non-alternating polarity with respect to one or more adjacent inner magnets of the plurality of inner magnets such that a first force to decouple the plurality of inner magnets from the plurality of outer magnets is higher than a second force to recouple the plurality of inner magnets to the plurality of outer magnets.

Example 9 is the magnet assembly of example(s) 8, wherein: the plurality of outer magnets comprises at least a first outer magnet, a second outer magnet, and a third outer magnet; the plurality of inner magnets comprises at least a first inner magnet, a second inner magnet, and a third inner magnet; the first outer magnet and the first inner magnet are of a first size; the second outer magnet and the second inner magnet are of a second size; and the third outer magnet and the third inner magnet are of a third size.

Example 10 is the magnet assembly of example(s) 9, wherein a complete coupling of the plurality of inner magnets to the plurality of outer magnets comprises the first outer magnet aligning with the first inner magnet, the second outer magnet aligning with the second inner magnet, and the third outer magnet aligning with the third inner magnet.

Example 11 is the magnet assembly of example(s) 8, wherein a polarity sequence of the plurality of outer magnets and the polarity sequence of the plurality of inner magnets are for the piston to extend into a portion of the safety valve such that as the piston extends, a jumping effect caused by a misalignment of at least one outer magnet and at least one inner magnet contributes to the second force to recouple the plurality of inner magnets to the plurality of outer magnets.

Example 12 is the magnet assembly of example(s) 8, wherein the magnet assembly is for use in a wireline retrievable safety valve.

Example 13 is the magnet assembly of example(s) 8, wherein the magnet assembly is for use in a subsurface safety valve.

Example 14 is a method comprising: providing a plurality of outer magnets coupled to a piston configured for displacing a flow tube, at least some of the plurality of outer magnets having a non-alternating polarity with respect to one or more adjacent outer magnets of the plurality of outer magnets; providing a plurality of inner magnets coupled to the flow tube of a safety valve, at least some of the plurality of inner magnets having a non-alternating polarity with respect to one or more adjacent inner magnets of the plurality of inner magnets; using a first force to move the piston to a retracted position, thereby moving the outer magnets by a mechanical linkage between the outer magnets and the piston, thereby moving the inner magnets by a magnetic coupling between the outer magnets and the inner magnets, thereby moving the flow tube coupled to the inner magnets across a flapper valve, to open the safety valve; and using a second force to move the piston to an extended position, thereby moving the outer magnets by the mechanical linkage between the outer magnets and the piston, thereby moving the inner magnets by the magnetic coupling between the outer magnets and the inner magnets, thereby moving the flow tube coupled to the inner magnets away from the flapper valve, to close the safety valve, wherein the first force is higher than the second force.

Example 15 is the method of example(s) 14, further comprising: providing at least a first outer magnet, a second outer magnet, and a third outer magnet within the plurality of outer magnets; and providing at least a first inner magnet, a second inner magnet, and a third inner magnet within the plurality of inner magnets, wherein: the first outer magnet and the first inner magnet are of a first size; the second outer magnet and the second inner magnet are of a second size; and the third outer magnet and the third inner magnet are of a third size.

Example 16 is the method of example(s) 15, further comprising coupling the plurality of inner magnets to the plurality of outer magnets by aligning the first outer magnet with the first inner magnet, the second outer magnet with the second inner magnet, and the third outer magnet with the third inner magnet.

Example 17 is the method of example(s) 14, further comprising contributing to the second force to recouple the plurality of inner magnets to the plurality of outer magnets by arranging a polarity sequence of the plurality of inner magnets and the polarity sequence of the plurality of outer magnets such that as the piston extends into a portion of the safety valve, a jumping effect results from a misalignment of at least one outer magnet and at least one inner magnet.

Example 18 is the method of example(s) 14, further comprising resisting a closing of the flapper valve by magnetically coupling the plurality of inner magnets to the plurality of outer magnets to hold the flow tube across the flapper valve as a result of the extended position of the piston.

Example 19 is the method of example(s) 14, further comprising recoupling the plurality of inner magnets to the plurality of outer magnets by a wireline or slickline.

Example 20 is the method of example(s) 14, further comprising closing the flapper valve by magnetically coupling the plurality of the inner magnets to the plurality of outer magnets to hold the flow tube away from the flapper valve as a result of the retracted position of the piston.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A safety valve usable in a wellbore, the safety valve comprising:
   a piston configured for displacing a flow tube;

a flapper valve;
the flow tube for opening the flapper valve;
a plurality of outer magnets attached to the piston, at least some of the plurality of outer magnets having a non-alternating polarity with respect to one or more adjacent outer magnets of the plurality of outer magnets; and
a plurality of inner magnets attached to the flow tube, at least some of the plurality of inner magnets having the non-alternating polarity with respect to one or more adjacent inner magnets of the plurality of inner magnets such that a first force to decouple the plurality of inner magnets from the plurality of outer magnets is higher than a second force to recouple the plurality of inner magnets to the plurality of outer magnets, wherein:
the plurality of outer magnets comprises a first outer magnet of a first size, a second outer magnet of a second size, and a third outer magnet of a third size;
the plurality of inner magnets comprises a first inner magnet of the first size, a second inner magnet of the second size, and a third inner magnet of the third size; and
the first size is different from the second size or from the third size.

2. The safety valve of claim 1, wherein a complete coupling of the plurality of inner magnets to the plurality of outer magnets comprises the first outer magnet aligning with the first inner magnet, the second outer magnet aligning with the second inner magnet, and the third outer magnet aligning with the third inner magnet.

3. The safety valve of claim 1, wherein a polarity sequence of the plurality of outer magnets and the polarity sequence of the plurality of inner magnets are for the piston to extend into a portion of the safety valve such that as the piston extends, a jumping effect caused by a misalignment of at least one outer magnet and at least one inner magnet contributes to the second force to recouple the plurality of inner magnets to the plurality of outer magnets.

4. The safety valve of claim 1, wherein the safety valve is a wireline retrievable safety valve.

5. The safety valve of claim 1, wherein the safety valve is a subsurface safety valve.

6. The subsurface safety valve of claim 5, wherein a complete coupling of the plurality of inner magnets to the plurality of outer magnets holds the piston in an extended position within the safety valve, thus holding the flow tube over the flapper valve to open the flapper valve, thus utilizing the complete coupling of the plurality of inner magnets to the plurality of outer magnets to resist a closing of the flapper valve.

7. The safety valve of claim 1, wherein the second force to recouple the plurality of inner magnets to the plurality of outer magnets is applied after a slam closure.

8. A magnet assembly for a safety valve usable in a wellbore, the magnet assembly comprising:
a plurality of outer magnets attached to a piston of the safety valve, at least some of the plurality of outer magnets having a non-alternating polarity with respect to one or more adjacent outer magnets of the plurality of outer magnets,
a plurality of inner magnets attached to a flow tube of the safety valve, at least some of the plurality of inner magnets having a non-alternating polarity with respect to one or more adjacent inner magnets of the plurality of inner magnets such that a first force to decouple the plurality of inner magnets from the plurality of outer magnets is higher than a second force to recouple the plurality of inner magnets to the plurality of outer magnets, wherein:
the plurality of outer magnets comprises a first outer magnet of a first size, a second outer magnet of a second size, and a third outer magnet of a third size;
the plurality of inner magnets comprises a first inner magnet of the first size, a second inner magnet of the second size, and a third inner magnet of the third size; and
the first size is different from the second size or from the third size.

9. The magnet assembly of claim 8, wherein a complete coupling of the plurality of inner magnets to the plurality of outer magnets comprises the first outer magnet aligning with the first inner magnet, the second outer magnet aligning with the second inner magnet, and the third outer magnet aligning with the third inner magnet.

10. The magnet assembly of claim 8, wherein a polarity sequence of the plurality of outer magnets and the polarity sequence of the plurality of inner magnets are for the piston to extend into a portion of the safety valve such that as the piston extends, a jumping effect caused by a misalignment of at least one outer magnet and at least one inner magnet contributes to the second force to recouple the plurality of inner magnets to the plurality of outer magnets.

11. The magnet assembly of claim 8, wherein the magnet assembly is for use in a wireline retrievable safety valve.

12. The magnet assembly of claim 8, wherein the magnet assembly is for use in a subsurface safety valve.

13. A method comprising:
providing a plurality of outer magnets attached to a piston configured for displacing a flow tube, at least some of the plurality of outer magnets having a non-alternating polarity with respect to one or more adjacent outer magnets of the plurality of outer magnets, wherein the plurality of outer magnets comprises a first outer magnet of a first size, a second outer magnet of a second size, and a third outer magnet of a third size;
providing a plurality of inner magnets attached to the flow tube of a safety valve, at least some of the plurality of inner magnets having a non-alternating polarity with respect to one or more adjacent inner magnets of the plurality of inner magnets, wherein:
the plurality of inner magnets comprises a first inner magnet of the first size, a second inner magnet of the second size, and a third inner magnet of the third size; and
the first size is different from the second size or from the third size;
using a first force to move the piston to a retracted position, thereby moving the outer magnets by a mechanical linkage between the outer magnets and the piston, thereby moving the inner magnets by a magnetic coupling between the outer magnets and the inner magnets, thereby moving the flow tube coupled to the inner magnets away from a flapper valve, to close the safety valve; and
using a second force to move the piston to an extended position, thereby moving the outer magnets by the mechanical linkage between the outer magnets and the piston, thereby moving the inner magnets by the magnetic coupling between the outer magnets and the inner magnets, thereby moving the flow tube coupled to the inner magnets across the flapper valve, to open the safety valve, wherein the first force is higher than the second force.

14. The method of claim 13, further comprising coupling the plurality of inner magnets to the plurality of outer magnets by aligning the first outer magnet with the first inner magnet, the second outer magnet with the second inner magnet, and the third outer magnet with the third inner magnet.

15. The method of claim 13, further comprising contributing to the second force to recouple the plurality of inner magnets to the plurality of outer magnets by arranging a polarity sequence of the plurality of inner magnets and the polarity sequence of the plurality of outer magnets such that as the piston extends into a portion of the safety valve, a jumping effect results from a misalignment of at least one outer magnet and at least one inner magnet.

16. The method of claim 13, further comprising resisting a closing of the flapper valve by magnetically coupling the plurality of inner magnets to the plurality of outer magnets to hold the flow tube across the flapper valve as a result of the extended position of the piston.

17. The method of claim 13, further comprising recoupling the plurality of inner magnets to the plurality of outer magnets by a wireline or slickline.

18. The method of claim 13, further comprising closing the flapper valve by magnetically coupling the plurality of the inner magnets to the plurality of outer magnets to hold the flow tube away from the flapper valve as a result of the retracted position of the piston.

* * * * *